(12) United States Patent
Hara et al.

(10) Patent No.: US 6,201,054 B1
(45) Date of Patent: Mar. 13, 2001

(54) RUBBER COMPOSITION FOR TIRE TREAD

(75) Inventors: Seiji Hara, Shirakawa; Kiyoshige Muraoka, Kobe, both of (JP)

(73) Assignee: Sumitomo Rubber Industries, Ltd., Hyogo-ken (JP)

( * ) Notice: Subject to any disclaimer, the term of this patent is extended or adjusted under 35 U.S.C. 154(b) by 0 days.

(21) Appl. No.: 09/224,803

(22) Filed: Dec. 31, 1998

(30) Foreign Application Priority Data

Jan. 14, 1998 (JP) .................................................. 10-005475

(51) Int. Cl.$^7$ ........................................................ C08K 3/34
(52) U.S. Cl. ............................................. 524/492; 523/212
(58) Field of Search .............................................. 524/492

(56) References Cited

U.S. PATENT DOCUMENTS

| | | | |
|---|---|---|---|
| 5,162,409 | 11/1992 | Mrockowski . | |
| 5,705,549 | * 1/1998 | Hojo | 524/211 |
| 6,005,027 | * 12/1999 | Guillet | 523/209 |
| 6,008,295 | * 12/1999 | Takeichi | 525/105 |

FOREIGN PATENT DOCUMENTS

| | | |
|---|---|---|
| 0682071 A1 | 11/1995 | (EP) . |
| 61882 | 1/1994 | (JP) . |
| 6240050 | 8/1994 | (JP) . |
| 9241426 | 9/1997 | (JP) . |
| 9241430 | 9/1997 | (JP) . |

OTHER PUBLICATIONS

J.E. Roger, Research Disclosure, No. 385, May 1, 1996, p. 286 XP000599710.

I. Franta, 1988, Elsevier, Amsterdam, NL XP002099728, p. 429.

* cited by examiner

*Primary Examiner*—Paul R. Michl
(74) *Attorney, Agent, or Firm*—Birch, Stewart, Kolasch & Birch, LLP

(57) ABSTRACT

The present invention can provide the rubber composition for tire treads which comprises a specific wet silica and a rubber component containing a brominated isobutylene/paramethylstyrene copolymer and gives tire treads having an enhanced grip performance. The rubber composition for tire treads comprises a polymer containing not less than 30% by weight of a brominated isobutylene/paramethylstyrene copolymer, wet silica having a BET specific surface area of 100 to 250 m$^2$/g after allowed to stand at 150° C. for 0.5 hour in nitrogen atmosphere in an amount of 50 to 200 parts by weight on the basis of 100 parts by weight of the polymer and a silane compound in an amount corresponding to 1 to 15% by weight based on the wet silica.

9 Claims, No Drawings

RUBBER COMPOSITION FOR TIRE TREAD

BACKGROUND OF THE INVENTION

The present invention relates to a rubber composition which is suitable for tire treads having excellent wet grip performance.

A higher stability at high speed has been so far required for tires with the development of a highway network, and particularly enhancement of grip performance on a wet road has been required.

For example, JP-A-6-1882, JP-A-6-240050, JP-A-9-241430 and JP-A-9-241426 disclose that mainly from the viewpoint of enhancing wet skid characteristics, ozone resistance and flexibility, a halogenated butyl rubber and a brominated copolymer of isomonoolefin and paramethylstyrene are used as a rubber component and carbon black is added as a reinforcing material.

Recently from the viewpoint of enhancing wet grip performance, silica is added instead of a part or the whole of carbon black.

In that case, in the rubber composition containing silica, since dispersibility of silica is low, there was a problem that characteristics of silica such as an enhancement of abrasion resistance and wet grip performance cannot be exhibited sufficiently.

An object of the present invention is to obtain a rubber composition for tire treads which comprises a rubber component containing a brominated isobutylene/ paramethylstyrene copolymer and a specific wet silica and has an enhanced wet grip performance.

SUMMARY OF THE INVENTION

The present invention relates to a rubber composition for tire treads which comprises; a polymer containing not less than 30% by weight of a brominated isobutylene/paramethylstyrene copolymer, wet silica having a BET specific surface area of 100 to 250 m$^2$/g after allowed to stand at 150° C. for 0.5 hour in nitrogen atmosphere in an amount of 50 to 200 parts by weight on the basis of 100 parts by weight of the polymer, and a silane compound, in an amount corresponding to 1 to 15% by weight based on the wet silica, which is represented by the formula (1): Z—R—S$_n$—R—Z, (2): Z—R—SH, (3): Z—R—NH$_3$, (4) Z—CH=CH$_2$ or (5) Z—R—X in which R is a divalent hydrocarbon radical having 1 to 18 carbon atoms, n is an interger of 2 to 8, Z is —Si(R$^1$)$_2$R$^2$, —SiR$^1$(R$^2$)$_2$ or —Si(R$^2$)$_3$ provided that R$^1$ is alkyl having 1 to 4 carbon atoms, cyclohexyl or phenyl, R$^2$ is alkoxyl having 1 to 8 carbon atoms, cycloalkoxyl having 5 to 8 carbon atoms or aryloxy having 6 to 8 carbon atoms and X is halogen atom.

In that case, it is preferred that tan δ (10 Hz, 0° C., 0.5%) is not less than 0.5 and that when a modulus of shearing elasticity G is measured at dynamic shear amplitudes of 5%, 25%, 50%, 100% and 150% three times each under the conditions of a frequency of 10 Hz and a temperature of 70° C., the modulus of shearing elasticity G(5%) at the third measurement of 5% and the modulus of shearing elasticity G(100%) at the third measurement of 10% satisfy the following equations.

$$G(5\%)/G(100\%) \leq 1.6 \qquad \text{Equation (I)}$$

and $$G(100\%) \geq 0.6 \qquad \text{Equation (II)}$$

Also when the wet silica is heated up from 20° C. to 500° C. at a temperature raising rate of 5° C./min, it is preferable that a percentage of weight reduction of the wet silica at 400° C. to that at 100° C. is not more than 0.70% by weight.

DETAILED DESCRIPTION

The brominated isobutylene/paramethylstyrene copolymer is contained in the polymer components of the present invention in an amount of not less than 30% by weight, and from the viewpoint of sufficiently exhibiting characteristics of each component, the content of the copolymer is preferably from 50 to 100% by weight, particularly preferably from 70 to 100% by weight.

The polymer components other than the brominated isobutylene/paramethylstyrene copolymer may be those which exhibit elasticity at normal temperature after the vulcanization. Examples thereof are, for instance, one or a mixture of two or more of diene rubbers such as styrene-butadiene rubber (SBR), natural rubber (NR), isoprene rubber (IR), butadiene rubber (BR), acrylonitrile-butadiene rubber (NBR) and ethylene propylene rubber (EPPM), chloroprene rubber (CR), butyl rubber (IIR), fluorine-containing rubber (FKM), epichlorohydrin rubber, and the like. Among them, one or a mixture of two or more of the styrene-butadiene rubber (SBR), natural rubber (NR), butyl rubber (IIR) and the like are preferable from the point that they are excellent in mechanical strength and have fatigue resistance and heat resistance.

The rubber composition for tire treads of the present invention contains wet silica which has a BET specific surface area of from 100 to 250 m$^2$/g after allowed to stand at 150° C. for 0.5 hour in nitrogen atmosphere. The BET specific surface area is preferably from 150 to 250 m$^2$/g from the viewpoint of an enhancement of the mechanical strength of the vulcanized rubber composition. Particularly in case of the rubber composition obtained by adding a relatively large amount of silica, if the BET specific surface area exceeds 250 m$^2$/g, at the time when the silica is added to the polymer, the rubber composition becomes too hard, resulting in poor processability.

Examples of such silica are, for instance, "NIPSIL VN3" available from Nippon Silica Kabushiki Kaisha, "ULTRASIL VN3" available from Degussa Co., "TOKUSIL V" available from Kabushiki Kaisha Tokuyama, "CARPLEX XR" available from Shionogi & Co., Ltd., and the like.

Further in the present invention, when the wet silica is heated up from 20° C. to 500° C. at a temperature raising rate of 5° C./min, it is preferable that a percentage of weight reduction of the wet silica at 400° C. to that at 100° C. (also referred to as "weight reduction percentage") is not more than 0.70% by weight. Further the weight reduction percentage is preferably from 0.20 to 0.70% by weight from the point that a small amount of water is necessary at the time of chemical bonding of the silane compound and silica.

The wet silica having the weight reduction percentage of not more than 0.70% by weight can be obtained by the method disclosed in JP-A-9-345972. Concretely the wet silica having the BET specific surface area within the above-mentioned range may be heat-treated at 130° to 180° C. under a pressure of 5 to 20 mmHg for 60 to 120 minutes.

An adding amount of the silica in the present invention may be from 50 to 200 parts by weight based on 100 parts by weight of the above-mentioned polymer components. From the viewpoint of maintaining strength of the vulcanized rubber and exhibiting a good processability at kneading, the adding amount is preferably from 50 to 150 parts by weight, particularly preferably from 60 to 120 parts by weight.

In the present invention, the rubber composition contains a silane compound represented by the formulae (1): Z—R—$S_n$—R—Z, (2): Z—R—SH, (3): Z—R—$NH_3$, (4) Z—CH=$CH_2$ or (5) Z—R—X in which R is a divalent hydrocarbon radical having 1 to 18 carbon atoms, n is an integer of 2 to 8, Z is —$Si(R^1)_2R^2$, —$SiR^1(R^2)_2$ or —$Si(R^2)_3$ provided that $R^1$ is alkyl having 1 to 4 carbon atoms, cyclohexyl or phenyl, $R^2$ is alkoxyl having 1 to 8 carbon atoms, cycloalkoxyl having 5 to 8 carbon atoms or aryloxy having 6 to 8 carbon atoms and X is halogen atom.

In the rubber composition of the present invention, the silane compound functions as a coupling agent to be chemically bonded to both of the silica and polymer for bonding the silica and polymer.

In the formulae (1) to (5), Z is represented by —$Si(R^1)_2R^2$, —$SiR^1(R^2)_2$ or —$Si(R^2)_3$, $R^1$ is alkyl having 1 to 4 carbon atoms such as methyl, ethyl, propyl or butyl, cyclohexyl or phenyl, $R^2$ is alkoxyl having 1 to 8 carbon atoms such as methoxy, ethoxy or buthoxy, cycloalkoxyl having 5 to 8 carbon atoms such as cyclohexyloxy or aryloxy having 6 to 8 carbon atoms such as phenoxy or benzyloxy. R is a divalent hydrocarbon radical having 1 to 18 carbon atoms such as ethylene or propylene.

Examples of the silane compound represented by the formula (1) are, for instance,

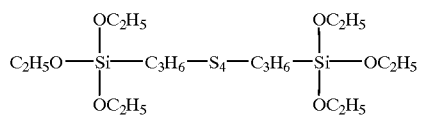

and the like. Examples of the commercially available silane compound represented by the formula (1) are Si69 (3,3'-bis(triethoxysilylpropyl)tetrasulfide) available from Degussa Co., and the like.

Also examples of the silane compound represented by the formula (2) are, for instance,

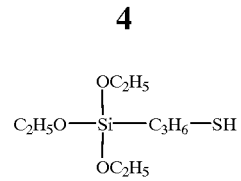

and the like. Examples of the commercially available silane compound represented by the formula (2) are TSL8380 available from Toshiba Silicone Co., Ltd., KBM803 (3-mercaptopropyltriethoxysilane) available from Shin-Etsu Chemical Co., Ltd., and the like.

Also examples of the silane compound represented by the formula (3) are, for instance,

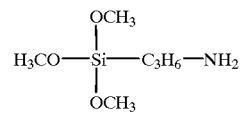

and the like. Examples of the commercially available silane compound represented by the formula (3) are KBM903 (γ-aminopropyltrimethoxysilane) available from Shin-Etsu Chemical Co., Ltd., and the like.

Also examples of the silane compound represented by the formula (4) are, for instance,

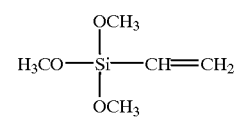

and the like. Examples of the commercially available silane compound represented by the formula (4) are KBM1003 (vinyltrimethoxysilane) available from Shin-Etsu Chemical Co., Ltd., and the like.

Also examples of the silane compound represented by the formula (5) are, for instance,

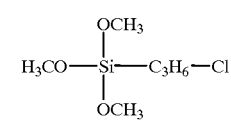

and the like. Examples of the commercially available silane compound represented by the formula (5) are KBM703 (γ-chloropropyltrimethoxysilane) available from Shin-Etsu Chemical Co., Ltd., and the like.

Among them, from the viewpoint of scorching of the rubber, 3,3'-bis(triethoxysilylpropyl)tetrasulfide is preferred.

An adding amount of the silane compound may be an amount corresponding to 1 to 15% by weight based on the water-containing silica. The amount is preferably one corresponding to 1 to 10% by weight, particularly 4 to 8% by weight from the points of preventing a phenomenon that the excess coupling agent is precipitated on the rubber surface and preventing increase in material cost.

In addition to the above-mentioned components, if necessary, to the rubber composition of the present invention an be added optionally a white filler such as silica, talc or clay excluding the above-mentioned wet silica and a filler such as carbon black; a softening agent such as a paraffinic, aromatic or naphthenic process oil; a tackifier such as a cumarone-indene resin, rosine resin or cyclopentadiene resin; a vulcanizing agent such as sulfur or peroxide; a vulcanization accelerator; an activator such as a stearic acid or zinc oxide; a rubber antioxidant; and the like, in a range not impairing effects of the present invention.

Particularly it is preferable that the filler excluding the wet silica, softening agent and tackifier are added in optionally selected amounts within the ranges of from 20 to 200 parts by weight, from 10 to 200 parts by weight and from 5 to 50 parts by weight, respectively. Also it is preferable that a total amount of the vulcanizing agent, vulcanization accelerator and activator is from 4 to 15 parts by weight from the point of adjusting the vulcanization speed to a proper value. It is preferable that the rubber antioxidant is added in an optionally selected amount within the range of from 1 to 10 parts by weight from the point of exhibiting antioxidation property and not adding excessively.

The rubber composition of the present invention can be obtained by usual method by using a Banbury mixer, open roll, or the like.

It is preferred that the so-obtained rubber composition of the present invention has tan $\delta$ (10 Hz, 0° C., 0.5%) of not less than 0.5 and that when the modulus of shearing elasticity G is measured at dynamic shear amplitudes of 5%, 25%, 50%, 100% and 150% three times each under the conditions of a frequency of 10 Hz and a temperature of 70° C., the modulus of shearing elasticity G(5%) at the third measurement of 5% and the modulus of shearing elasticity G(100%) at the third measurement of 10% satisfy the following equations.

$$G(5\%)/G(100\%) \leq 1.6 \qquad \text{Equation (I)}$$

and $$G(100\%) \geq 0.6 \qquad \text{Equation (II)}$$

The tan$\delta$ (10 Hz, 0° C., 0.5%) representing a viscoelastic characteristic is used for an evaluation of the wet grip performance, and the larger its value is, the more excellent and preferable the wet grip performance is. Particularly it is preferable that tan $\delta$ is not less than 0.5.

The modulus of shearing elasticity G measured under the conditions of a frequency of 10 Hz and a temperature of 70° C. represents a hardness of the rubber under the measuring conditions as close to those in actual running as possible by using a test machine also in consideration of a heat build up phenomenon caused by running tires. Particularly the moduli of shearing elasticity G measured at dynamic shear amplitudes of 5% and 100% show a hardness of the rubber at the moment the tire contacts the ground (small strain) and a hardness of the rubber when the tire then rotates and receives large strain, respectively.

In the present invention from the point that the wet grip performance is enhanced in the case where the rubber becomes soft when receiving a small strain and becomes hard when receiving a large strain, it is preferable that the moduli of shearing elasticity G(5%) and G(100%) at 5% and 100% of dynamic shear amplitudes at the time of the third measurement satisfy the following equations.

$$G(5\%)/G(100\%) \leq 1.6 \qquad \text{Equation (I)}$$

and $$G(100\%) \geq 0.6 \qquad \text{Equation (II)}$$

A vulcanized rubber having such characteristics can be obtained by kneading each component in the above-mentioned mixing ratio under the kneading conditions mentioned below.

The G(5%), G(100%) and tan $\delta$ can be regulated to be within the mentioned ranges by the two-staged kneading method by using an internal kneader, namely by kneading at a vessel temperature of not more than 70° C. for not less than 5 minutes at the first stage and then kneading at a vessel temperature of from 90° to 140° C. for not less than 5 minutes at the second stage.

The rubber composition of the present invention can be suitably applied to tire treads.

The present invention is then explained in more detail by means of the following examples, but is not limited to them.

EXAMPLE

Each component which was used in examples is shown in Table 1.

Examples 1 to 6

According to the mixing amounts shown in Table 2, at first each component except sulfur and the vulcanization accelerator was kneaded by a 3-liter kneader available from Moriyama Seisakusho Kabushiki Kaisha. Then the obtained mixture, 1 part by weight of sulfur, 1.5 parts by weight of the vulcanization accelerator A and 2 parts by weight of the vulcanization accelerator B were mixed by an open roll, followed by vulcanizing at 170° C. for 30 minutes to give the vulcanized rubber compositions 1 to 6 of the present invention.

To all the rubber compositions were mixed 1.5 parts by weight of the wax, 2 parts by weight of the rubber antioxidant A, 1 part by weight of the rubber antioxidant B, 4 parts by weight of the zinc oxide and 2 parts by weight of the stearic acid.

(Method of Test)

① Tensile test: According to JIS K6301, M100, M300, $T_B$ and $E_B$ were measured. M300 may be not less than 4.1 MPa.

② Viscoelasticity test for small strain: By using a dynamic viscoelastic tester DVA-200 available from Shimadzu Corporation, tanδ (10 Hz, 0° C., 0.5%) was measured by tensile strain under the conditions of a frequency of 10 Hz, a temperature of 0° C. and a dynamic strain of 0.5% (prestrain stretching: 10%). It is preferred that tan δ (10 Hz, 0° C., 0.5%) is not less than 0.5.

③ Viscoelasticity test for large strain: By using a 1.5 ton dynamic shear tester available from Tokyo Koki Kabushiki Kaisha, the modulus of shearing elasticity G was measured at dynamic shear amplitudes of 5%, 25%, 50%, 100% and 150% three times each under the conditions of a frequency of 10 Hz and a temperature of 70° C. By using the modulus of shearing elasticity G(5%) at the third measurement of 5% and the modulus of shearing elasticity G(100%) at the third measurement of 10%, the value of G(100%) and the value of G(5%)/G(100%) were obtained to evaluate the wet grip performance. It is preferred that G(100%) is not less than 0.6 and that G(5%)/G(100%) is not more than 1.6.

④ Grip performance on wet road: Tires having treads obtained from the above-mentioned rubber compositions were produced by usual method. By running a car provided with those tires, the dry grip performance was evaluated with a lap time and feeling of the driver. In the running test, the same driver ran the car five times on a test course of a specified distance, and every lap time for each tire was measured. An average of three shorter lap times is calculated for each tire and is shown by an index provided that an average time of Comparative Example 1 mentioned hereinafter is 100. The larger the index is, the more excellent the grip performance is. The feeling of the driver was evaluated by five grades of 1 to 5, provided that the feeling of Comparative Example 1 is 2, namely when the feeling is better than in Comparative Example 1, the grade is higher, and when the feeling is worse than in Comparative Example 1, the grade is lower.

The results of the tests are shown in Table 2.

Comparative Examples 1 to 6

Comparative rubber compositions 1 to 6 were prepared in the same manner as in Example 1 except that the mixing amounts were changed as shown in Table 2, and the same tests as in Examples were carried out. The results are shown in Table 2.

TABLE 1

| Components | |
|---|---|
| Brominated isobutylene/paramenthylstyrene copolymer | EXXPRO 90-10 available from Exxon Chemical |
| SBR | |
| A | NIPOL NS420 available from Nippon Zeon (Oil extended: polymer/aromatic oil = 100/50) |
| B | SBR1500 available from Nippon Synthetic Rubber Co., Ltd. |
| Silica | |
| A | ULTRASIL VN3 available from Degussa Co. (BET specific surface area: 210 m$^2$/g) |
| B | ULTRASIL VN2 available from Degussa Co. (BET specific surface area: 130 m$^2$/g) |
| C | NIPSIL ER available from Nippon Silica Co. (BET specific surface area: 90 m$^2$/g) |
| D | 5 mmHg of silica A heat-treated at 150° C. for 1.5 hours (Weight reduction percentage: 0.7% by weight) |
| Carbon black | |
| A | DIABLACK I (ISAF class) available from Mitsubishi Chemical Co. |
| B | DIABLACK H (HAF class) available from Mitsubishi Chemical Co. |
| X-50S | X-50S available from Degussa Japan, Co. [1:1 mixture(weight ratio) of carbon black of HAF class and 3,3'-bis(triethoxysilylpropyl)-tetrasulfide] |
| Aromatic oil | JOMOX140 available from Japan Energy Co. |
| Paraffinic wax | SANNOC N available from Ohuchi Shinko Kagaku Kogyo Kabushiki Kaisha |
| Rubber antioxidant | |
| A | SANTOFLEX 13 available from Flexsys Co. |
| B | NOCRAC 224 available from Ohuchi Shinko Kagaku Kogyo Kabushiki Kaisha |
| Zinc oxide | Zinc oxide Class 2 available from Mitsui Kinzoku Kogyo Kabushiki Kaisha |
| Stearic acid | KIRI available from NOF Corporation |
| Sulfur | Powder sulfur available from Tsurumi Kagaku Kabushiki Kaisha |
| Vulcanization accelerator | |
| A | NOCCELER D available from Ohuchi Shinko Kagaku Kogyo Kabushiki Kaisha |
| B | NOCCELER NS available from Ohuchi Shinko Kagaku Kogyo Kabushiki Kaisha |

TABLE 2

|  | Ex. 1 | Ex. 2 | Com. Ex. 1 | Com. Ex. 2 | Ex. 3 | Com. Ex. 3 | Ex. 4 | Com. Ex. 4 | Ex. 5 | Ex. 6 | Com. Ex. 5 | Com. Ex. 6 |
|---|---|---|---|---|---|---|---|---|---|---|---|---|
| Mixing amount (part by weight) | | | | | | | | | | | | |
| Brominated isobutylene/paramethylstyrene copolymer | 50 | 50 | — | — | 30 | 20 | 50 | 50 | 50 | 50 | 50 | 50 |
| SBR | | | | | | | | | | | | |
| A (SBR amount) | 75 (50) | — | 75 (50) | — | 105 (70) | 120 (80) | 75 (50) | 75 (50) | 75 (50) | 75 (50) | 75 (50) | 75 (50) |
| B | — | 50 | 50 | 100 | — | — | — | — | — | — | — | — |
| Silica | | | | | | | | | | | | |
| A | 110 | 110 | 110 | 110 | 110 | 110 | 110 | 110 | 60 | — | — | 40 |
| B | — | — | — | — | — | — | — | 110 | — | — | — | — |
| C | — | — | — | — | — | — | — | — | 110 | — | — | — |
| D | — | — | — | — | — | — | — | — | — | 110 | — | — |
| X-50S | | | | | | | | | | | | |
| X-50S | 22 | 22 | 22 | 22 | 22 | 22 | 22 | 22 | 12 | 22 | — | 8 |
| Carbon black in X-50S | 11 | 11 | 11 | 11 | 11 | 11 | 11 | 11 | 6 | 11 | — | 4 |
| Silane compound in X-50S | 11 | 11 | 11 | 11 | 11 | 11 | 11 | 11 | 6 | 11 | — | 4 |
| Carbon black | | | | | | | | | | | | |
| A | — | — | — | — | — | — | — | — | 50 | — | 110 | 70 |
| B | — | — | — | — | — | — | — | — | 5 | — | 11 | 7 |
| Aromatic oil | 100 | 125 | 100 | 125 | 90 | 85 | 100 | 100 | 100 | 100 | 100 | 100 |
| Results of evaluation | | | | | | | | | | | | |
| M100 (MPa) | 1.7 | 1.9 | 1.5 | 1.5 | 1.6 | 1.5 | 1.4 | 1.3 | 1.6 | 1.7 | 2.2 | 1.9 |
| M300 (MPa) | 5.1 | 4.5 | 5.7 | 5.5 | 4.2 | 5.3 | 4.1 | 3.7 | 5.0 | 6.2 | 4.8 | 4.9 |
| $T_B$ (MPa) | 6.1 | 5.1 | 13.1 | 12.9 | 5.7 | 7.6 | 5.5 | 4.6 | 6.0 | 6.9 | 5.8 | 5.9 |
| $E_B$ (%) | 370 | 380 | 580 | 590 | 410 | 470 | 380 | 440 | 340 | 330 | 290 | 320 |
| G (5%) (MPa) | 0.78 | 0.95 | 1.39 | 1.40 | 0.85 | 0.92 | 0.74 | 0.71 | 1.23 | 0.78 | 2.03 | 1.68 |
| G (100%) (MPa) | 0.65 | 0.71 | 0.59 | 0.62 | 0.52 | 0.48 | 0.43 | 0.32 | 0.75 | 0.71 | 0.82 | 0.77 |
| G (5%)/G (100%) | 1.20 | 1.34 | 2.36 | 2.27 | 1.63 | 1.92 | 1.72 | 2.22 | 1.64 | 1.10 | 2.48 | 2.18 |
| tan δ (10 Hz, 0° C., 0.5%) | 0.76 | 0.61 | 0.52 | 0.53 | 0.78 | 0.75 | 0.48 | 0.39 | 0.53 | 0.74 | 0.42 | 0.47 |
| Grip performance | 114 | 108 | 100 | 98 | 109 | 101 | 106 | 94 | 108 | 119 | 88 | 92 |
| Feeling of driver | 4 | 4 | 2 | 2 | 3 | 2 | 3 | 2 | 3 | 5 | 1 | 2 |

From the results of the evaluations of Examples 1 to 4 and Comparative Examples 1 to 4, it is seen that the tires having treads produced from the rubber composition of claim 1 are very excellent in the grip performance on a wet road. It is also seen that among the rubber compositions within the range of claim 1, particularly those having the viscoelasticity (tan δ and dependency on strain (=G(5%)/G(100%)) of the modulus of shearing elasticity of claim 2 (Examples 1 and 2) are particularly excellent in the grip performance.

From the results of comparing Example 1 with Comparative Example 5 and Example 5 with Comparative Example 6, in the case where carbon black is added instead of silica, tan δ becomes smaller, the elasticity against a small strain (=G(5%)) becomes larger and thus the dependency on strain of the modulus of shearing elasticity (=G(5%)/G(100%)) is increased. That is, since the elasticity against a small strain is large and tan δ (10 Hz, 0° C., 0.5%) is small, it is seen that the grip performance is lowered.

Example 6 shows tires having treads produced from the rubber composition of claim 1 in the case where silica within the range of claim 3 is used. It is seen that those tires are most excellent in the grip performance on a wet road.

The present invention can provide the rubber composition for tire treads which comprises a specific wet silica and a rubber component containing a brominated isobutylene/paramethylstyrene copolymer and gives tire treads having an enhanced grip performance.

What is claimed is:

1. A rubber composition for tire treads comprising; a polymer containing not less than 30% by weight of a brominated isobutylene/paramethylstyrene copolymer, wet silica having a BET specific surface area of 100 to 250 m²/g after allowed to stand at 150° C. for 0.5 hour in nitrogen atmosphere in an amount of 50 to 200 parts by weight on the basis of 100 parts by weight of the polymer, and a silane compound, in an amount corresponding to 1 to 15% by weight based on the wet silica, which is represented by the formula (1): Z—R—S$_n$—R—Z, (2): Z—R—SH, (3): Z—R—NH$_3$, (4) Z—CH=CH$_2$ or (5) Z—R—X in which R is a divalent hydrocarbon radical having 1 to 18 carbon atoms, n is an integer of 2 to 8, Z is —Si(R$^1$)$_2$R$^2$, —SiR$^1$(R$^2$)$_2$ or —Si(R$^2$)$_3$ provided that R$^1$ is alkyl having 1 to 4 carbon atoms, cyclohexyl or phenyl, R$^2$ is alkoxyl having 1 to 8 carbon atoms, cycloalkoxyl having 5 to 8 carbon atoms or aryloxy having 6 to 8 carbon atoms and X is halogen atom.

2. The rubber composition for tire treads of claim 1, wherein tanδ (10 Hz, 0° C., 0.5%) is not less than 0.5 and when a modulus of shearing elasticity G is measured at dynamic shear amplitudes of 5%, 25%, 50%, 100% and 150% three times each under the conditions of a frequency of 10 Hz and a temperature of 70° C., the moduli of shearing elasticity G(5%) at the third measurement of 5% and the modulus of shearing elasticity G(100%) at the third measurement of 10% satisfy the following equations:

$$G(5\%)/G(100\%) \leq 1.6 \qquad \text{Equation (I)}$$

and $$G(100\%) \geq 0.6 \qquad \text{Equation (II)}.$$

3. The rubber composition for tire treads of claim 1, wherein when the wet silica is heated up from 20° C. to 500° C. at a temperature raising rate of 5° C./min, a percentage of weight reduction of the wet silica at 400° C. to that at 100° C. is not more than 0.70% by weight.

4. The rubber composition for tire treads of claim 1, further comprising one or a mixture of two or more diene rubbers selected from the group consisting of styrene-butadiene rubber, natural rubber, isoprene rubber, butadiene rubber, acrylonitrile-butadiene rubber, ethylene propylene rubber, chloroprene rubber, butyl rubber, fluorine-containing rubber and epichlorohydrin rubber.

5. The rubber composition for tire treads of claim 1, wherein the wet silica has a BET specific surface area of 150 to 250 $m^2/g$ after standing at 150° C. for 0.5 hours in a nitrogen atmosphere.

6. The rubber composition for tire treads of claim 3, wherein the percentage of weight reduction of the wet silica at 400° C. to that at 100° C. is from 0.20 to 0.70% by weight.

7. The rubber composition for tire treads of claim 1, wherein the wet silica is in an amount of 50 to 150 parts by weight on the basis of 100 parts by weight of the polymer.

8. The rubber composition for tire treads of claim 1, wherein the silane compound is selected from the group consisting of 3,3'-bis(triethoxysilylpropyl)tetrasulfide), 3-mercaptopropyltriethoxysilane), γ-aminopropyltrimethoxysilane, vinyltrimethoxysilane, and γ-chloropropyltrimethoxysilane.

9. The rubber composition for tire treads of claim 1, wherein the silane compound is in an amount corresponding to 1 to 10% by weight based on the wet silica.

* * * * *